(12) United States Patent
Ptacek et al.

(10) Patent No.: US 8,710,804 B2
(45) Date of Patent: Apr. 29, 2014

(54) DISCHARGE CIRCUIT AND METHOD

(75) Inventors: Karel Ptacek, Roznov Pod Radhostem (CZ); Juan Carlos Pastrana, Chandler, AZ (US); Jiri Bubla, Stezery (CZ); Jaromir Uherek, Velke Karlovice (CZ)

(73) Assignee: Semiconductor Components Industries, LLC, Phoenix, AZ (US)

( * ) Notice: Subject to any disclaimer, the term of this patent is extended or adjusted under 35 U.S.C. 154(b) by 330 days.

(21) Appl. No.: 13/190,306

(22) Filed: Jul. 25, 2011

(65) Prior Publication Data

US 2013/0027999 A1  Jan. 31, 2013

(51) Int. Cl.
*H02H 3/24* (2006.01)

(52) U.S. Cl.
USPC .............. 320/166; 307/109; 336/92

(58) Field of Classification Search
USPC ............ 320/166; 307/109, 100, 326; 361/92
See application file for complete search history.

(56) References Cited

U.S. PATENT DOCUMENTS

| | | | |
|---|---|---|---|
| 5,523,665 A | 6/1996 | Deaver | |
| 8,115,457 B2 * | 2/2012 | Balakrishnan et al. | 320/166 |
| 8,461,915 B2 * | 6/2013 | Huang et al. | 327/544 |
| 2008/0246459 A1 | 10/2008 | Ingman | |
| 2009/0290385 A1 | 11/2009 | Jungreis et al. | |
| 2010/0309694 A1 | 12/2010 | Huang et al. | |
| 2011/0025278 A1 | 2/2011 | Balakrishnan et al. | |
| 2012/0112564 A1* | 5/2012 | Wu et al. | 307/326 |

OTHER PUBLICATIONS

Reference Design Report for Active Discharging of the X Capacitor for reduced No-load Power Consumption Using CAP Zero CAP014DG, by the Applications Engineering Department, Document No. RDR-252, Apr. 10, 2010, pp. 1-24, Revision 1.0, www.powerint.com.

Application Note AN-48 CAPZERO-Family, Design Considerations, Power Integrations, Rev. C 09/10, pp. 1-7, www.powerint.com.

* cited by examiner

*Primary Examiner* — Harry Behm
(74) *Attorney, Agent, or Firm* — Rennie William Dover

(57) ABSTRACT

In accordance with an embodiment, a power supply may include a filter stage coupled to an input terminal of a discharge circuit and a supply capacitor coupled to an output terminal of the discharge circuit. In accordance with another embodiment, a method for discharging at least one capacitor includes discharging the at least one capacitor in response to a signal at the input terminal of the discharge circuit being different from a reference signal.

24 Claims, 6 Drawing Sheets

DISCHARGE CIRCUIT AND METHOD

BACKGROUND

The present invention relates, in general, to electronics and, more particularly, to methods of forming semiconductor devices and structure.

In the past, the electronics industry used switching mode power supplies to provide regulated power to electronic devices used in communications systems, aviation systems, telecommunications systems, consumer electronics, etc. A technique for providing regulated power is described in U.S. Patent Application Publication No. 2008/0246459 filed by Thomas M. Ingman and published on Oct. 9, 2008. An area of concern in these applications is power consumption in the switching mode power supplies. Techniques for lowering power consumption have been described in U.S. Patent Application Publication No. 2010/0309694 A1 filed by Wei-Hsuan Huang et al. and in Application Note AN-48, Rev. C, titled "CAPZero-Family Design Considerations," published by Power Integrations in September 2010. Although the techniques included in these disclosures may lower the power consumption, they may not be suitable for meeting the discharge requirements of the X capacitors such as those specified in, for example, the IEC 60950 Safety guidelines for information technology equipment Accordingly, it would be advantageous to have a method and structure for discharging the X capacitors. In addition, it is desirable for the method and structure to be cost and time efficient to implement.

BRIEF DESCRIPTION OF THE DRAWINGS

The present invention will be better understood from a reading of the following detailed description, taken in conjunction with the accompanying drawing figures, in which like reference characters designate like elements and in which.

Figure 1:
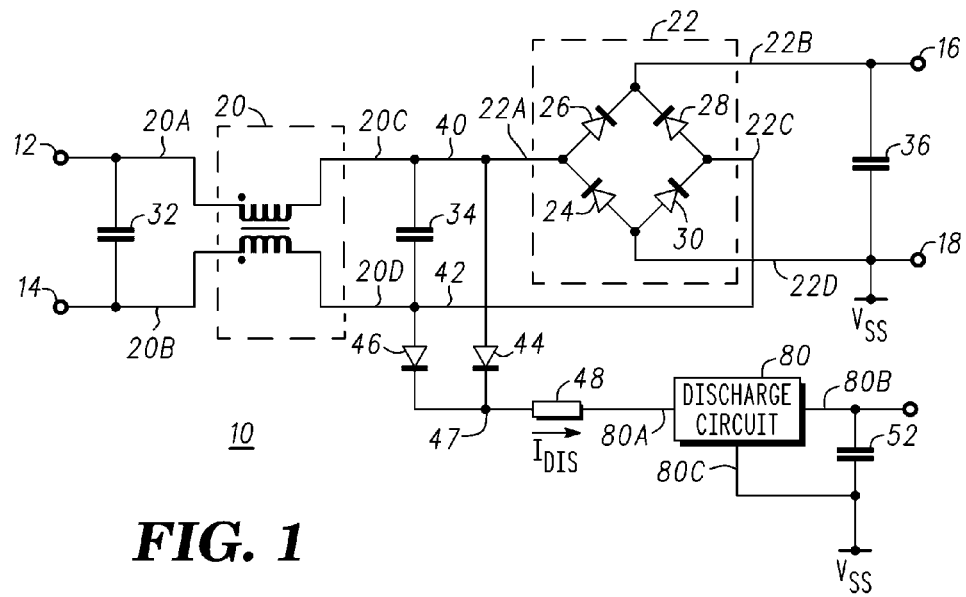
FIG. 1 is a circuit schematic of a converter in accordance with an embodiment of the present invention.

For simplicity and clarity of illustration, elements in the figures are not necessarily to scale, and the same reference characters in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current flow through the device such as a gate of an MOS transistor or a base of a bipolar transistor. Although the devices are explained herein as certain N-channel or P-channel devices, or certain N-type or P-type doped regions, a person of ordinary skill in the art will appreciate that complementary devices are also possible in accordance with embodiments of the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action and the initial action. The use of the words approximately, about, or substantially means that a value of an element has a parameter that is expected to be very close to a stated value or position. However, as is well known in the art there are always minor variances that prevent the values or positions from being exactly as stated. It is well established in the art that variances of up to about ten percent (10%) (and up to twenty percent (20%) for semiconductor doping concentrations) are regarded as reasonable variances from the ideal goal of exactly as described.

It should be noted that a logic zero voltage level ($V_L$) is also referred to as a logic low voltage and that the voltage level of a logic zero voltage is a function of the power supply voltage and the type of logic family. For example, in a Complementary Metal Oxide Semiconductor (CMOS) logic family a logic zero voltage may be thirty percent of the power supply voltage level. In a five volt Transistor-Transistor Logic (TTL) system a logic zero voltage level may be about 0.8 volts, whereas for a five volt CMOS system, the logic zero voltage level may be about 1.5 volts. A logic one voltage level ($V_H$) is also referred to as a logic high voltage level and, like the logic zero voltage level, the logic high voltage level also may be a function of the power supply and the type of logic family. For example, in a CMOS system a logic one voltage may be about seventy percent of the power supply voltage level. In a five volt TTL system a logic one voltage may be about 2.4 volts, whereas for a five volt CMOS system, the logic one voltage may be about 3.5 volts.

DETAILED DESCRIPTION

Generally the present invention provides a converter having a discharge circuit that may be integrated with a startup circuit and a method for discharging input filter capacitors in response to the converter being disconnected from the mains. In accordance with an embodiment, the voltages on each AC input terminal of the converter are OR'ed using a diode for each input terminal. For example, the voltage on input terminals 12 and 14 are OR'ed using diodes 44 and 46 shown in FIG. 1. The discharge circuit detects the removal of the AC line voltage by detecting high-to-low voltage transitions and low-to-high voltage transitions at the input terminal of the discharge circuit. An input terminal of the discharge circuit is connected to the OR'ing diodes. The discharge circuit includes a timer that is reset on each high-to-low and each low-to-high transition of the input signal to the timer. If transitions are not detected before the timer expires, the supply capacitor is discharged to the lower supply threshold using a constant current source, a switch, or a silicon controlled rectifier (SCR). In response to reaching the lower supply threshold, the discharge circuit discharges the input filter capacitors and transfers the charge stored in the input filter capacitors to the supply capacitor. Embodiments described herein are suitable for meeting X2 capacitor discharge requirements in response to the mains being disconnected from the converter, e.g., discharging to a suitable voltage in less than one second.

FIG. 1 is a circuit schematic of a converter 10 in accordance with an embodiment of the present invention. Converter 10 is comprised of alternating current (AC) input terminals 12 and 14 coupled to output terminals 16 and 18 through an inductive filter 20 and a bridge rectifier 22. Inductive filter 20 has input terminals 20A and 20B and output terminals 20C and 20D, where AC input terminals 12 and 14 are connected to input terminals 20A and 20B, respectively. Bridge rectifier 22 is comprised of diodes 24, 26, 28, and 30. The cathode of diode 24 is connected to the anode of diode 26 to form a bridge terminal 22A, the cathode of diode 26 is connected to the cathode of diode 28 to form a bridge terminal 22B, the anode of diode 28 is connected to the cathode of diode 30 to form a bridge terminal 22C, and the anode of diode 30 is connected to the anode of diode 24 to form a bridge terminal 22D. Bridge terminal 22A is connected to output terminal 20C of inductive filter 20 and bridge terminal 22C is connected to output terminal 20D of inductive filter 20. Bridge terminal 22B is connected to output terminal 16 and bridge terminal 22D is connected to output terminal 18. It should be noted that input terminal 20A of inductive filter 20 may serve as AC input terminal 12, input terminal 20B of inductive filter 20 may serve as AC input terminal 14, bridge terminal 22B may serve as output terminal 16, and bridge terminal 22D may serve as output terminal 18.

A filter capacitor 32 is coupled between input terminals 12 and 14 and a filter capacitor 34 is coupled between output terminals 20C and 20D, wherein a terminal of capacitor 34 is connected to terminals 20C and 22A to form a node 40 and the other terminal of capacitor 34 is connected to terminals 20D and 22C to form a node 42. Filter capacitors 32 and 34 may be referred to as capacitive filters or X2 capacitors. An output capacitor 36 is coupled between output terminals 16 and 18.

In accordance with an embodiment of the present invention, a diode 44 is connected to node 40 and a diode 46 is connected to node 42. More particularly, the anode of diode 44 is connected to node 40, the anode of diode 46 is connected to node 42, and the cathodes of diodes 44 and 46 are commonly connected together to form a node 47. An impedance element 48 has a terminal connected to the commonly connected cathodes of diodes 44 and 46, i.e., to node 47, and a terminal connected to an input terminal 80A of a discharge circuit 80. By way of example, impedance element 48 is a resistor.

Discharge circuit 80 has an input terminal 80A and output terminals 80B and 80C. A supply capacitor 52 is coupled between output terminal 80B and a source of operating potential $V_{SS}$. Supply capacitor 52 stores charge for operation of discharge circuit 80. Output terminal 80C may be coupled for receiving source of operating potential $V_{SS}$. By way of example, operating potential $V_{SS}$ is ground potential.

In operation, discharge circuit 80 senses the AC line signal, e.g., the voltage across nodes 40 and 42, through diodes 44 and 46 and impedance element 48. It should be noted that a signal at input terminal 80A is defined as an AC signal if it periodically decreases below a predetermined threshold voltage and periodically increases above the predetermined threshold voltage. In response to the voltage at input terminal 80A being greater or less than the predetermined threshold voltage for a predetermined amount of time, a discharge phase begins. It should be further noted that the AC line signal may be detected in response to the input signal crossing the predetermined threshold voltage in a positive or a negative direction, i.e., crossing through the predetermined threshold voltage in a direction of increasing voltage or a direction of decreasing voltage. By way of example, the AC line signal is detected in response to crossing through the predetermined threshold voltage from a low voltage level to a higher voltage level. During the discharge phase, capacitors 32 and 34 are discharged through diodes 44 and 46, impedance 48, and discharge circuit 80. The charge from capacitor 32, capacitor 34, or both capacitors 32 and 34 that is discharged by discharge circuit 80 may be used to supply a voltage to external circuitry that may be coupled to output terminal 80B.

Figure 2:
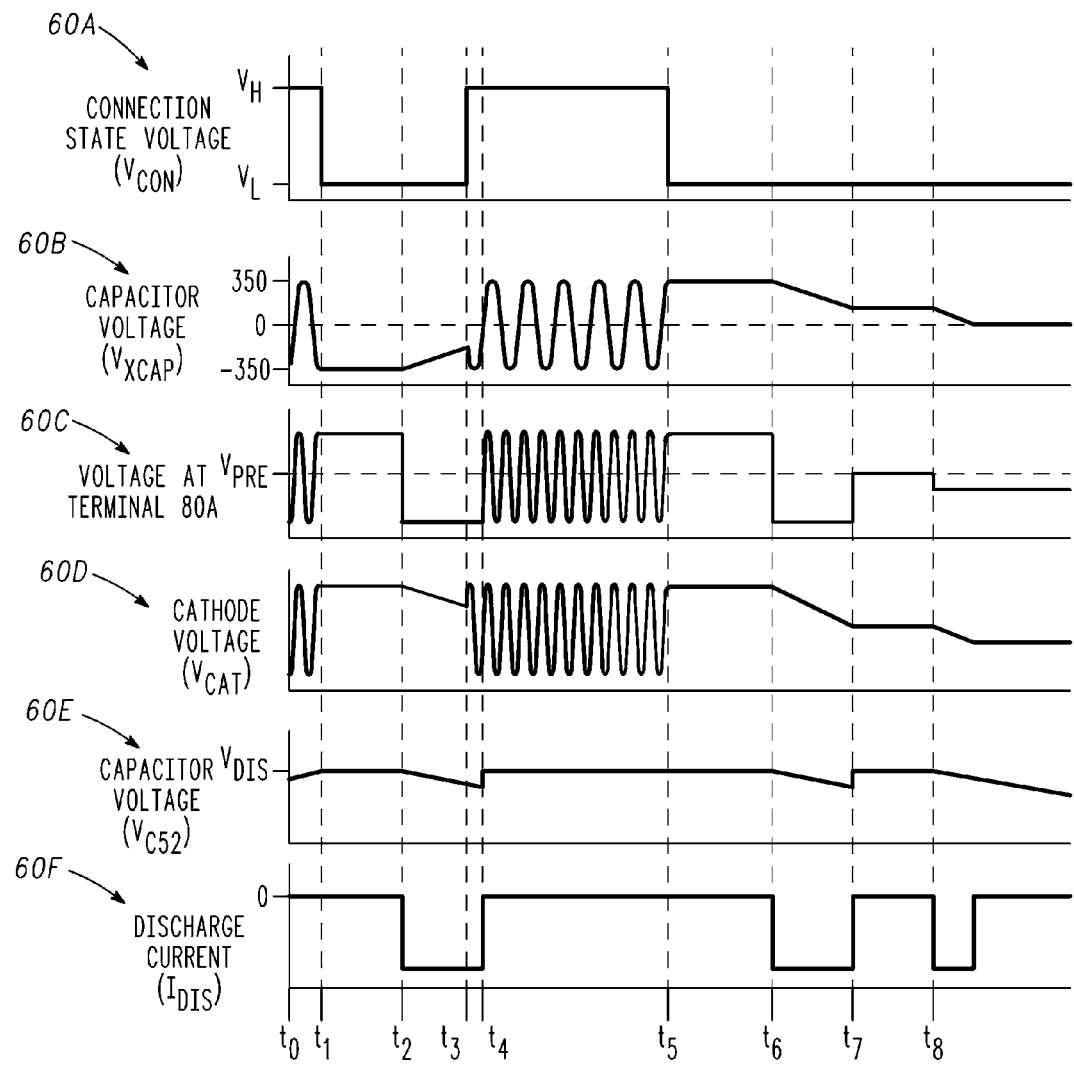
FIG. 2 is a timing diagram for the converter of FIG. 1 in accordance with an embodiment of the present invention.

FIG. 2 is a timing diagram 60 illustrating voltage plots 60A, 60B, 60C, 60D, 60E, and a current plot 60F during operation of, for example, converter 10 in accordance with an embodiment of the present invention. In response to an AC signal received across input terminals 12 and 14, a periodic AC signal is generated at input terminal 80A of discharge circuit 80. Diodes 44 and 46 and resistor 48 sense the presence of the AC signal at input terminals 12 and 14. More particularly, diodes 44 and 46 cooperate to create the periodic AC signal at their cathodes. Resistor 48 is an optional circuit element that spreads the power loss between itself and discharge circuit 80. In response to the AC signal at input terminal 80A, discharge circuit 80 operates such that a high impedance state appears at input terminal 80A. Thus, in response to the signal at input terminal 80A transitioning through a predetermined level $V_{PRE}$, discharge circuit 80 operates such that the high impedance state appears at input terminal 80A. By way of example the predetermined value $V_{PRE}$ is about 20 volts. This voltage level may differ in accordance with the voltage level of the mains or can be adaptive. In response to the absence of an AC signal at input terminal 80A, discharge circuit 80 discharges capacitors 32 and 34 (shown in FIG. 1) until the DC voltage at input terminal 80A is less than a voltage that maintains discharge circuit 80 in an on state. By way of example, the DC voltage level is about 5 volts.

Still referring to FIG. 2, at time $t_0$, the socket is plugged in, i.e., an AC signal is connected to input terminals 12 and 14. In plot 60A, connection state voltage signal $V_{CON}$ is at a logic high voltage level at time $t_0$ indicating that an AC signal is connected to input terminals 12 and 14. It should be noted that connection signal $V_{CON}$ is included for the sake of understanding the operation of discharge circuit 80 and may not be present or included in a circuit implementation. Plot 60B illustrates that at time $t_0$ the capacitor voltage signal $V_{XCAP}$ across nodes 40 and 42, is a portion of a periodic voltage signal that is rising or increasing and plot 60D illustrates the rectified (or OR'ed) AC voltage $V_{CAT}$ at the cathodes of diodes 44 and 46. It should be noted that the frequency of the rectified AC voltage at the cathodes of diodes 44 and 46 is greater than that of voltage $V_{XCAP}$ across nodes 40 and 42. Plot 60E illustrates that at time $t_0$ the capacitor voltage signal $V_{C52}$ across capacitor 52 increases because capacitor 52 is being charged by circuitry (not shown) attached to output terminal 80B. Plot 60C illustrates the voltage waveform at terminal 80A, which is similar to that at the cathodes of diodes 44 and 46 between times $t_0$ and $t_1$. Plot 60F indicates the absence of a discharge current $I_{DIS}$ at time $t_0$, i.e., the discharge current at time $t_0$ is substantially equal to zero amperes.

At time $t_1$, the AC signal is removed from input terminals 12 and 14 by, for example, unplugging or disconnecting input terminals 12 and 14 from a power source such as, for example, the mains. In response to the removal of the AC signal, connection state voltage $V_{CON}$ shown in plot 60A transitions to a logic low voltage level and capacitor voltage $V_{XCAP}$ becomes a substantially constant voltage having a magnitude that is very large, e.g., about 350 volts, and a function of the voltage on the mains and when the removal of the AC signal occurred. For instance, the AC voltage signal may oscillate between voltage levels of +350 volts and −350 volts. Plot 60B illustrates the removal of the AC signal when the voltage $V_{XCAP}$ is about −350 volts. Capacitor voltage $V_{C52}$ remains at a substantially constant value $V_{DIS}$.

In addition, at time $t_1$ cathode voltage $V_{CAT}$ becomes a substantially constant value having a magnitude of about +350 volts. As discussed above and unlike capacitor voltage $V_{XCAP}$, cathode voltage $V_{CAT}$ arises from a rectified voltage signal. At time $t_1$, discharge circuit 80 is in a high impedance state, discharge current $I_{DIS}$ is substantially zero amperes, and cathode voltage $V_{CAT}$ appears at input terminal 80A. Thus, discharge circuit 80 senses or monitors the voltage at input terminal 80A, which is indicative of the voltage across nodes 40 and 42, i.e., voltage $V_{XCAP}$. More particularly, the voltage signal at input terminal 80A serves as a sense signal for the voltage across nodes 40 and 42 and thus at input terminals 12 and 14. Discharge circuit 80 monitors this voltage for a predetermined period of time such as, for example, 50 milliseconds.

In response to the voltage signal at input terminal 80A remaining substantially constant for the predetermined period of time, discharge circuit 80 generates a discharge current $I_{DIS}$ at time $t_2$, which begins to discharge capacitors 32 and 34 and decrease cathode voltage $V_{CAT}$ at node 47. In addition, discharge circuit 80 generates a current that pulls input terminal 80A to a lower voltage level such as, for example, a voltage level substantially equal to $V_{SS}$ plus the drain-to-source voltages of two transistors. Capacitor 52 supplies power to the system, which discharges capacitor 52 and decreases voltage $V_{C52}$. Embodiments of discharge circuit 80 are further described with reference to FIGS. 6 and 7.

At time $t_3$, an AC signal is applied to input terminals 12 and 14 by, for example, connecting input terminals 12 and 14 to an AC signal source such as, for example, the mains. Connection state indicator signal $V_{CON}$ transitions to a logic high voltage level indicating that an AC signal is coupled to input terminals 12 and 14. Coupling input terminals 12 and 14 to an AC signal source generates a periodic signal across nodes 40 and 42 as indicated by capacitor voltage signal $V_{XCAP}$.

Although an AC signal source has been coupled to input terminals 12 and 14 at time $t_3$, discharge circuit 80 continues generating a discharge current $I_{DIS}$ at time $t_3$ because the voltage drop across resistor 48 lowers the voltage at input terminal 80A and therefore a signal transition at input terminal 80A cannot be detected (shown in plot 60C). After a predetermined period of time such as, for example, 100 milliseconds discharge circuit 80 stops discharging and monitors the voltage level at terminal 80A.

At time $t_4$, discharge circuit 80 stops discharging. In response to the rising edge of the voltage signal at terminal 80A transitioning through the predetermined voltage level $V_{PRE}$ at time $t_4$, discharge current $I_{DIS}$ becomes substantially zero amperes. Capacitor 52 is charged by circuitry (not shown) coupled to terminal 80B and voltage $V_{C52}$ increases.

At time $t_5$, the AC signal is removed from input terminals 12 and 14 by, for example, unplugging or disconnecting input terminals 12 and 14 from a power source such as, for example, the mains. In response to the removal of the AC signal, connection state voltage $V_{CON}$ shown in plot 60A transitions to a logic low voltage level and capacitor voltage $V_{XCAP}$ becomes a substantially constant voltage having a magnitude that is very large, e.g., about 350 volts, and a function of the voltage on the mains and when the removal of the AC signal occurred. For instance, the AC voltage signal may oscillate between voltage levels of +350 volts and −350 volts. Plot 60B illustrates the removal of the AC signal when the voltage $V_{XCAP}$ is about 350 volts. Capacitor voltage $V_{C52}$ remains at a substantially constant value $V_{DIS}$.

In addition, at time $t_5$ cathode voltage $V_{CAT}$ becomes a substantially constant value having a magnitude of about +350 volts. As discussed above and unlike capacitor voltage $V_{XCAP}$, cathode voltage $V_{CAT}$ arises from a rectified voltage signal. At time $t_5$, discharge circuit 80 is in a high impedance state, discharge current $I_{DIS}$ is substantially zero amperes, and cathode voltage $V_{CAT}$ appears at input terminal 80A. Thus, discharge circuit 80 senses or monitors the voltage at input terminal 80A, which is indicative of the voltage across nodes 40 and 42, i.e., voltage $V_{XCAP}$. More particularly, the voltage signal at input terminal 80A serves as a sense signal for the voltage across nodes 40 and 42 and thus at input terminals 12 and 14. Discharge circuit 80 monitors this voltage for a predetermined period of time such as, for example, 100 milliseconds.

In response to the voltage signal at input terminal 80A remaining substantially constant for the predetermined period of time, discharge circuit 80 generates a discharge current $I_{DIS}$ at time $t_6$, which begins to discharge capacitors 32 and 34 and decrease cathode voltage $V_{CAT}$ at node 47. Capacitor 52 supplies power to the system, which discharges capacitor 52 and decreases voltage $V_{C52}$. It should be noted that the voltage at input terminal 80A at time $t_6$ may be greater than or less than the predetermined reference voltage $V_{PRE}$ for a time greater than the predetermined delay time, i.e., the voltage at input terminal 80A does not transition through voltage $V_{PRE}$ during the time period from times $t_5$-$t_6$. In addition, discharge circuit 80 generates a voltage that pulls input terminal 80A to a lower voltage level such as, for example, a voltage level substantially equal to $V_{SS}$ plus the drain-to-source voltages of two transistors.

In response to the predetermined time period elapsing at time $t_7$, discharge circuit 80 terminates the discharge process and waits for another discharge signal. Thus, discharge current $I_{DIS}$ becomes substantially zero amperes. If discharge circuit 80 does not sense a reset signal during a predetermined period of time, e.g., 100 milliseconds, discharge circuit 80 institutes another discharge cycle at time $t_8$. It should be noted that voltages $V_{CON}$, $V_{XCAP}$, $V_{C52}$, $V_{CAT}$, and the voltage at input terminal 80 remain at substantially constant levels between time periods $t_7$ and $t_8$ where the voltage levels are typically different from each other. This sequence is repeated until capacitors 40 and 42 are discharged, either completely or to an acceptable level.

Figure 3:
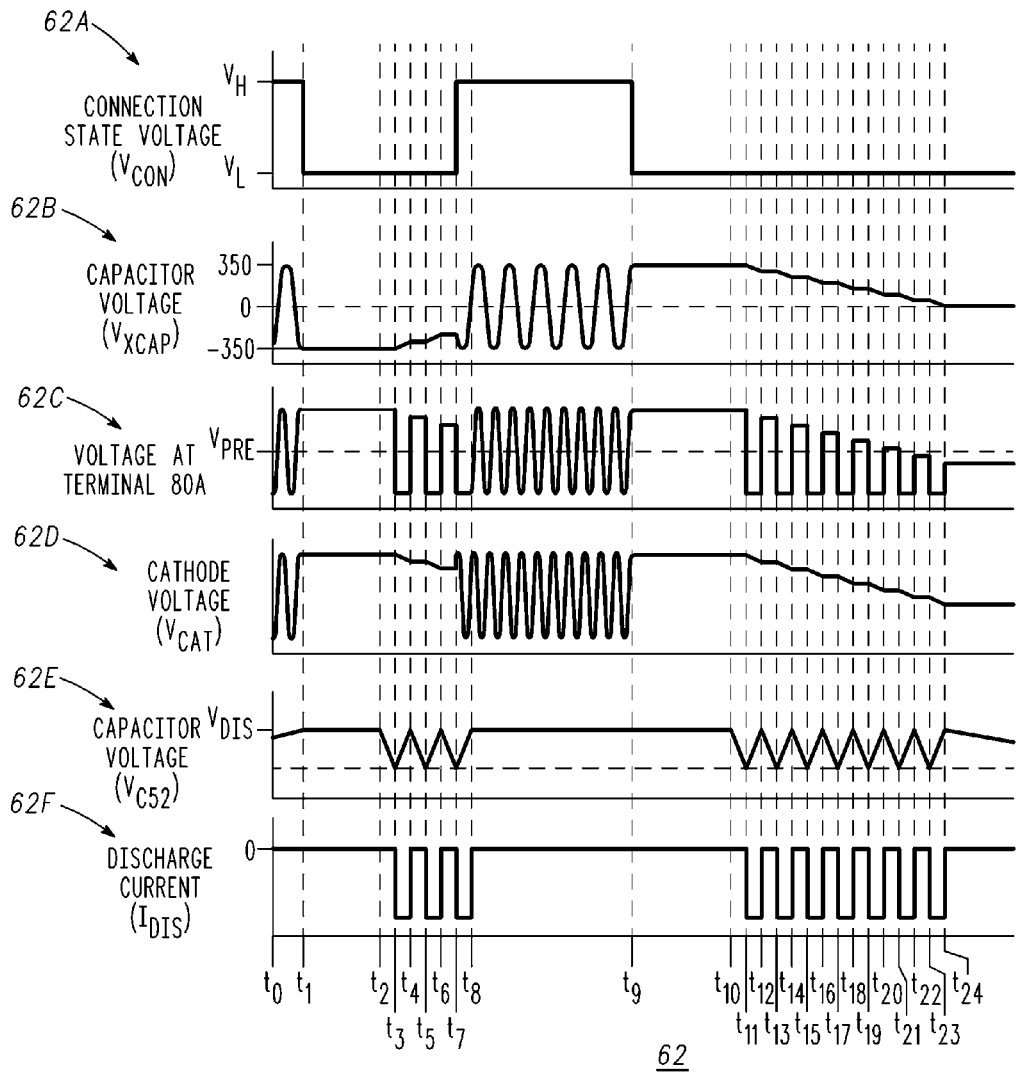
FIG. 3 is a timing diagram for the converter of FIG. 1 in accordance with another embodiment of the present invention.

FIG. 3 is a timing diagram 62 illustrating voltage plots 62A, 62B, 62C, 62D, 62E, and a current plot 62F during operation of, for example, converter 10 in accordance with another embodiment of the present invention. In response to an AC signal received across input terminals 12 and 14, a periodic AC signal is generated at input terminal 80A of discharge circuit 80. Diodes 44 and 46 and resistor 48 sense the presence of an AC signal at input terminals 12 and 14. More particularly, diodes 44 and 46 cooperate to create the periodic AC signal at their cathodes. Resistor 48 is an optional circuit element that spreads the power loss between itself and discharge circuit 80. In response to the AC signal at input terminal 80A, discharge circuit 80 operates such that a high impedance state appears at input terminal 80A. Thus, in response to the signal at input terminal 80A transitioning through a predetermined level $V_{PRE}$, discharge circuit 80 operates such that the high impedance state appears at input terminal 80A. By way of example the predetermined value $V_{PRE}$ is about 20 volts. This voltage level may differ in accordance with the voltage level of the mains or can be adaptive. In response to the absence of an AC signal at input terminal 80A, discharge circuit 80 discharges capacitors 32 and 34 (shown in FIG. 1) until the DC voltage at input terminal 80A is less than a voltage that maintains discharge circuit 80 in an on state. By way of example, the DC voltage level is about 5 volts.

Still referring to FIG. 3, at time $t_0$ the socket is plugged in, i.e., an AC signal is connected to input terminals 12 and 14. In plot 62A, connection state voltage signal $V_{CON}$ is at a logic high voltage level at time $t_0$ indicating that an AC signal is connected to input terminals 12 and 14. As discussed above, connection signal $V_{CON}$ is included for the sake of understanding the operation of discharge circuit 80 and may not be present or included in a circuit implementation. Plot 62B illustrates that at time $t_0$ the capacitor voltage signal $V_{XCAP}$ across nodes 40 and 42, is a portion of a periodic voltage signal that is rising or increasing and plot 62D illustrates the rectified (or OR'ed) AC voltage $V_{CAT}$ at the cathodes of diodes 44 and 46. It should be noted that the frequency of the rectified AC voltage at the cathodes of diodes 44 and 46 is greater than that of voltage $V_{XCAP}$ across nodes 40 and 42. Plot 62E illustrates that at time $t_0$ the capacitor voltage signal $V_{C52}$ across capacitor 52 increases because capacitor 52 is being charged by circuitry (not shown) attached to output terminal 80B. Plot 62C illustrates the voltage waveform at terminal 80A, which is similar to that at the cathodes of diodes 44 and 46 between times $t_0$ and $t_1$. Plot 62F indicates the absence of a discharge current $I_{DIS}$ at time $t_0$, i.e. the discharge current at time $t_0$ is substantially equal to zero amperes.

At time $t_1$, the AC signal (also referred to as the AC line) is removed from input terminals 12 and 14 by, for example, unplugging or disconnecting input terminals 12 and 14 from a power source such as, for example, the mains. In response to the removal of the AC signal, connection state voltage $V_{CON}$ shown in plot 62A transitions to a logic low voltage level and capacitor voltage $V_{XCAP}$ becomes a substantially constant voltage having a magnitude that is very large, e.g., about 350 volts, and a function of the voltage on the mains and when the removal of the AC signal occurred. For instance, the AC voltage signal may oscillate between voltage levels of +350 volts and −350 volts. Plot 62B illustrates the removal of the AC signal when the voltage $V_{XCAP}$ is about −350 volts. Capacitor voltage $V_{C52}$ remains at a substantially constant value $V_{DIS}$.

In addition, at time $t_1$ cathode voltage $V_{CAT}$ becomes a substantially constant value having a magnitude of about +350 volts. As discussed above and unlike capacitor voltage $V_{XCAP}$, cathode voltage $V_{CAT}$ arises from a rectified voltage signal. At time $t_1$, discharge circuit 80 is in a high impedance state, discharge current $I_{DIS}$ is substantially zero amperes, and cathode voltage $V_{CAT}$ appears at input terminal 80A. Thus, discharge circuit 80 senses or monitors the voltage at input terminal 80A, which is indicative of the voltage across nodes 40 and 42, i.e., voltage $V_{XCAP}$. More particularly, the voltage signal at input terminal 80A serves as a sense signal for the voltage across nodes 40 and 42 and thus at input terminals 12 and 14. Discharge circuit 80 monitors this voltage for a predetermined period of time such as, for example, 100 milliseconds.

In response to the voltage signal at input terminal 80A remaining substantially constant for the predetermined period of time, an internal timer of discharge circuit 80 validates that the AC signal has been removed from input terminals 12 and 14. In response to the validation, discharge circuit 80 discharges capacitor 52 to its minimum voltage level, which causes discharge circuit 80 to generate a discharge current $I_{DIS}$ at time $t_3$. Discharge current $I_{DIS}$ transfers the energy from capacitors 32 and 34 to capacitor 52 and charges capacitor 52 to a level that causes discharge circuit 80 to turn off discharge current $I_{DIS}$ at time $t_4$. Because there is no AC signal at input terminals 12 and 14, discharge circuit 80 discharges capacitor 52 to its minimum voltage level, which causes discharge circuit 80 to generate a discharge current $I_{DIS}$ at time $t_5$. Discharge current $I_{DIS}$ transfers the energy from capacitors 32 and 34 to capacitor 52 and charges capacitor 52 to a level that causes discharge circuit 80 to turn off discharge current $I_{DIS}$ at time $t_6$. This process continues until the AC signal is reapplied at time $t_7$ or capacitors 32 and 34 are completely discharged. In accordance with the example illustrated in FIG. 3, the AC signal is reapplied at time $t_7$.

Thus, at time $t_7$, an AC signal is applied to input terminals 12 and 14 by, for example, connecting input terminals 12 and 14 to an AC signal source such as, for example, the mains. Connection state indicator signal $V_{CON}$ transitions to a logic high voltage level indicating that an AC signal is coupled to input terminals 12 and 14. Coupling input terminals 12 and 14 to an AC signal source generates a periodic signal across nodes 40 and 42 as indicated by capacitor voltage signal $V_{XCAP}$, the voltage signal at terminal 80A, and cathode voltage $V_{CAT}$.

Although an AC signal source has been coupled to input terminals 12 and 14 at time $t_7$, discharge circuit 80 continues generating a discharge current $I_{DIS}$ at time $t_7$ until capacitor 52 is charged up.

At time $t_9$, the AC signal is removed from input terminals 12 and 14 by, for example, unplugging or disconnecting input terminals 12 and 14 from a power source such as, for example, the mains. In response to the removal of the AC signal, connection state voltage $V_{CON}$ shown in plot 62A transitions to a logic low voltage level and capacitor voltage $V_{XCAP}$ becomes a substantially constant voltage having a magnitude that is very large, e.g., about 350 volts, and a function of the voltage on the mains and when the removal of the AC signal occurred. For example, the AC voltage signal may oscillate between voltage levels of +350 volts and −350 volts. Plot 62B illustrates the removal of the AC signal when the voltage $V_{XCAP}$ is about 350 volts. Capacitor voltage $V_{C52}$ remains at a substantially constant value $V_{DIS}$.

In addition, at time $t_9$ cathode voltage $V_{CAT}$ becomes a substantially constant value having a magnitude of about +350 volts. As discussed above and unlike capacitor voltage $V_{XCAP}$, cathode voltage $V_{CAT}$ arises from a rectified voltage signal. At time $t_9$, discharge circuit 80 is in a high impedance state, discharge current $I_{DIS}$ is substantially zero amperes, and cathode voltage $V_{CAT}$ appears at input terminal 80A. Thus, discharge circuit 80 senses or monitors the voltage at input terminal 80A, which is indicative of the voltage across nodes 40 and 42, i.e., voltage $V_{XCAP}$. More particularly, the voltage signal at input terminal 80A serves as a sense signal for the voltage across nodes 40 and 42 and thus at input terminals 12 and 14. Discharge circuit 80 monitors this voltage for a predetermined period of time such as, for example, 100 milliseconds.

In response to the voltage signal at input terminal 80A remaining substantially constant for the predetermined period of time, an internal timer of discharge circuit 80 validates that the AC signal has been removed from input terminals 12 and 14. In response to the validation, discharge circuit 80 discharges capacitor 52, which causes discharge circuit 80 to generate a discharge current $I_{DIS}$ at time $t_{11}$. Discharge current $I_{DIS}$ transfers the energy from capacitors 32 and 34 to capacitor 52 and charges capacitor 52 to a level that causes discharge circuit 80 to turn off discharge current $I_{DIS}$ at time $t_{12}$. Because there is no AC signal at input terminals 12 and 14, discharge circuit 80 discharges capacitor 52 to its minimum voltage level, which causes discharge circuit 80 to generate a discharge current $I_{DIS}$ at time $t_{13}$. Discharge current $I_{DIS}$ transfers the energy from capacitors 32 and 34 to capacitor 52 and charges capacitor 52 to a level that causes discharge circuit 80 to turn off discharge current $I_{DIS}$ at time $t_{14}$. This process continues until capacitors 32 and 34 are completely discharged. It should be noted that because voltage signal $V_{C52}$ and discharge current $I_{DIS}$ oscillate over the time period from time $t_{11}$ to time $t_{24}$, voltage $V_{XCAP}$, the voltage at input terminal 80A, and voltage $V_{CAT}$ decrease over the period from time $t_{11}$ to time $t_{24}$ until capacitors 32 and 34 are discharged or discharged to a predetermine voltage.

Figure 4:
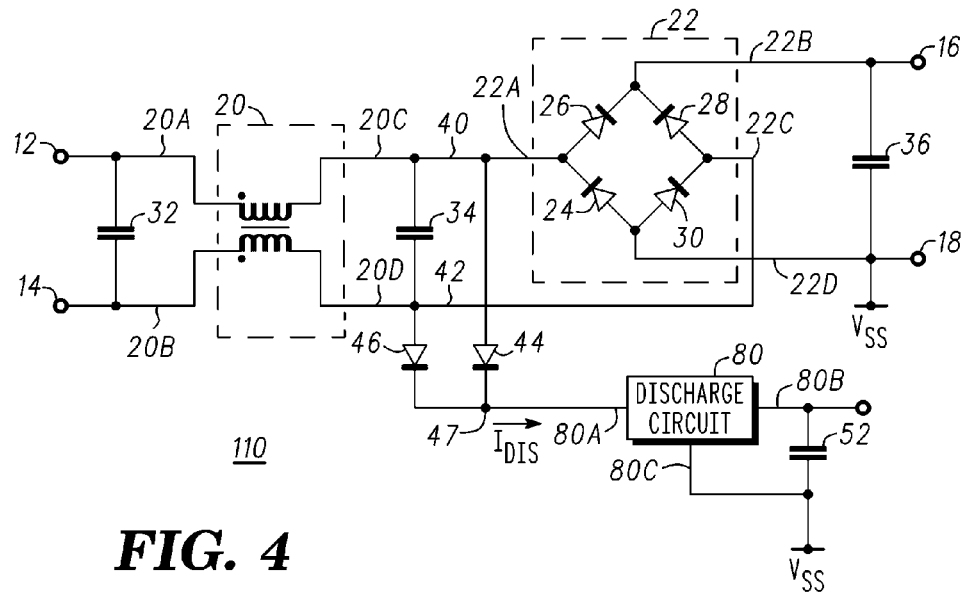
FIG. 4 is circuit schematic of a converter in accordance with another embodiment of the present invention.

FIG. 4 is a circuit schematic of a converter 110 in accordance with another embodiment of the present invention. Converter 110 is similar to converter 10 except that optional resistor 48 is absent. The operation of converter 80 is similar to that of converter 10. As mentioned above, resistor 48 spreads the power dissipation between itself and discharge circuit 80.

Figure 5:
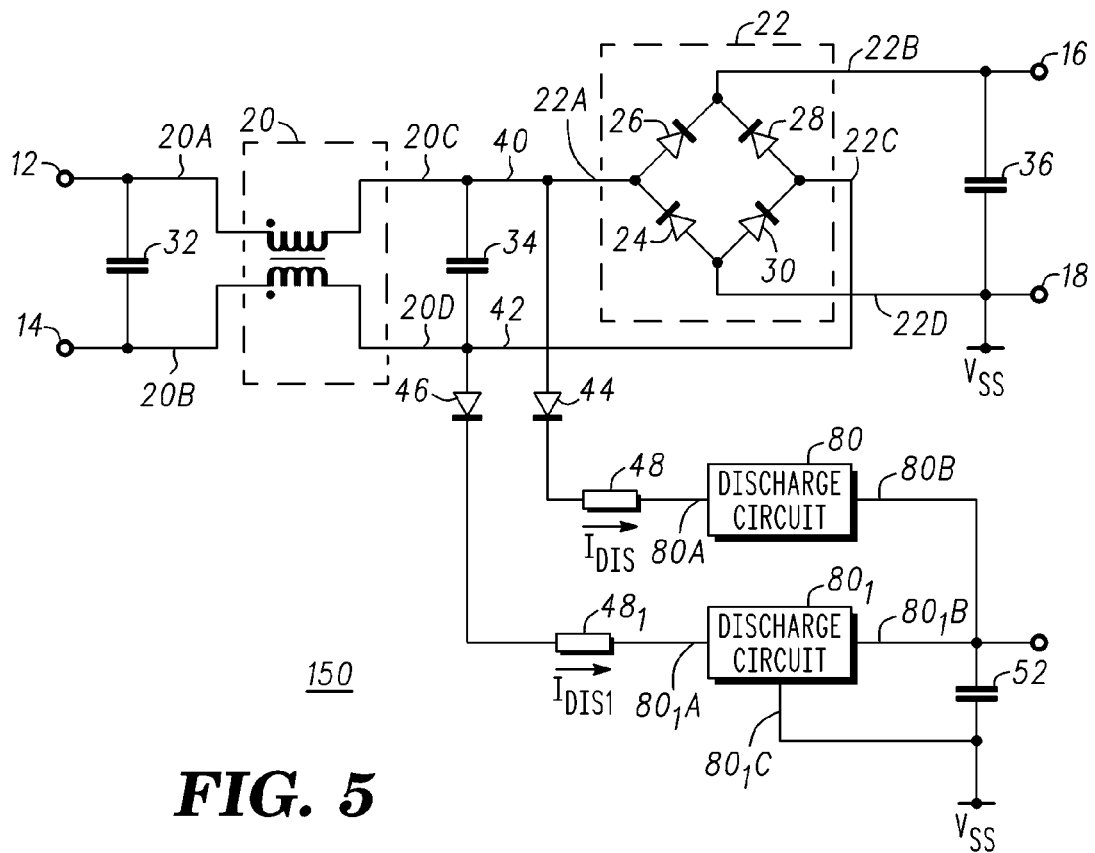
FIG. 5 is circuit schematic of a converter in accordance with another embodiment of the present invention.

FIG. 5 is a circuit schematic of a converter 150 in accordance with another embodiment of the present invention. Converter 150 is similar to converter 10 except that the cathodes of diodes 44 and 46 are not commonly connected together to form node 47. Rather, the cathode of diode 44 is coupled to discharge circuit 80 through impedance element 48 and the cathode of diode 46 is coupled to discharge circuit $80_1$ through an impedance element $48_1$. A discharge current $I_{DIS1}$ flows through impedance element $48_1$. Discharge circuits 80 and $80_1$ may have the same configuration as each other and impedance elements 48 and $48_1$ may have the same configuration or values as each other. The operation of converter 150 is similar to that of converter 10. Impedance elements 48 and $48_1$ spread the power dissipation between themselves and discharge circuits 80 and $80_1$, respectively.

Figure 6:
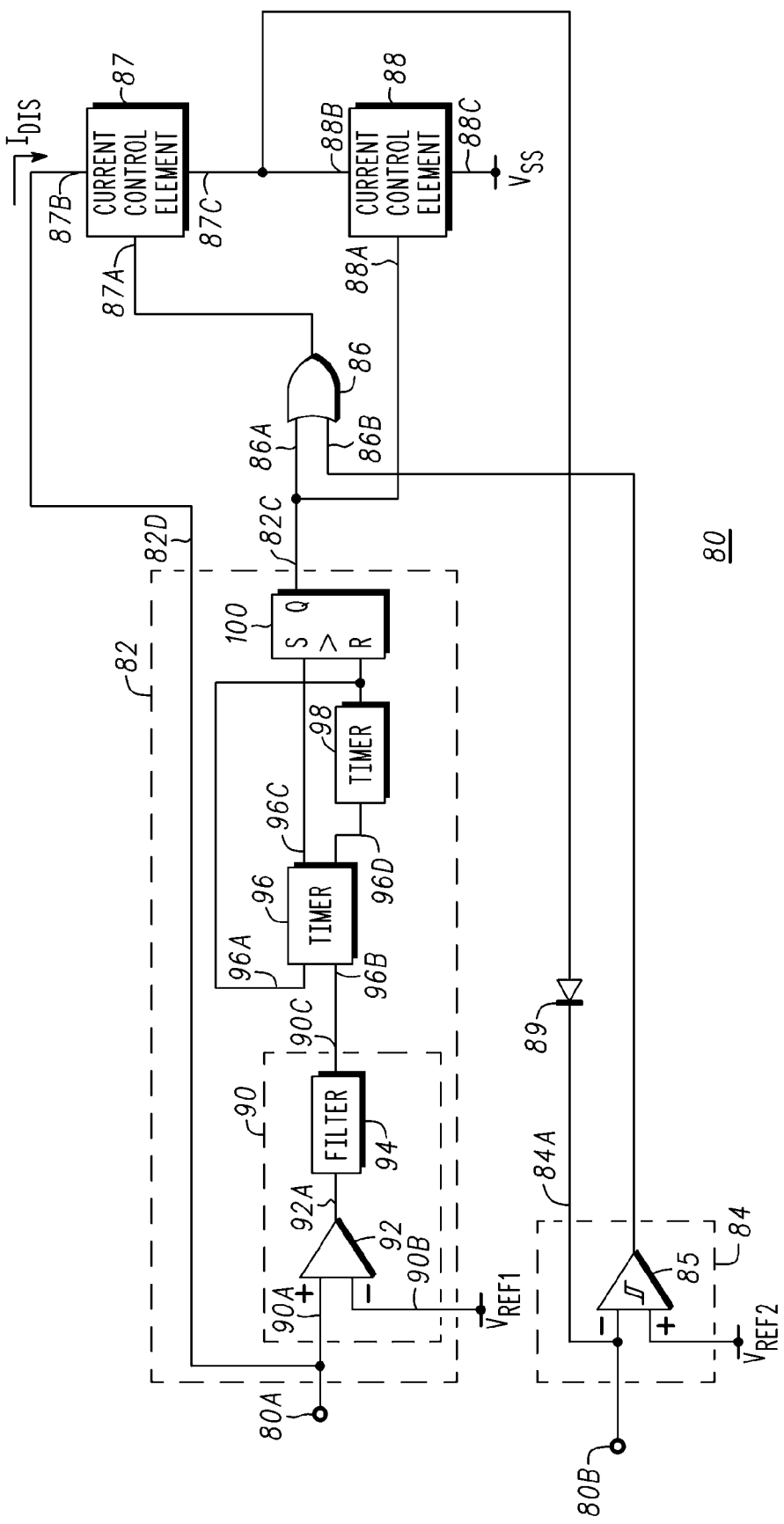
FIG. 6 is circuit schematic of a discharge circuit in accordance with another embodiment of the present invention.

FIG. 6 is a circuit schematic of discharge circuit 80 in accordance with an embodiment of the present invention. What is shown in FIG. 6 is a signal detection circuit 82 connected to an input terminal 86A of an OR gate 86 and a signal detection circuit 84 connected to an input terminal 86B of OR gate 86. Signal detection circuits 82 and 84 may be referred to as signal detection stages or detection stages and OR gate 86 may be referred to as a logic circuit, a gating element, or a gating circuit. Discharge circuit 80 may include a current control element 88 connected to a current control element 87. By way of example, current control element 87 is a current source and current control element 88 is a switch. Current source 87 has a control terminal 87A and current carrying terminals 87B and 87C, wherein control terminal 87A is connected to the output terminal of OR gate 86 and current carrying terminal 87B is connected to input terminal 80A of signal detection circuit 82. Switch 88 has a control terminal 88A commonly connected to an output terminal 82C of signal detection circuit 82 and to input terminal 86A of OR gate 86, a current carrying terminal 88B connected to current carrying terminal 87C of current source 87, and a current carrying terminal 88C coupled for receiving source of operating potential $V_{SS}$. Current carrying terminal 87C of current source 87 and the current carrying terminal 88B of switch 88 are connected to an input terminal 84A of signal detection circuit 84 through a diode 89. By way of example, switch 88 is a transistor having a gate terminal that serves as the control terminal, a drain terminal that serves as current carrying terminal 88B, and a source terminal that serves as current carrying terminal 88C. Alternatively, current control elements 87 and 88 may be switches or current control elements 87 and 88 may be current sources, or current control element 87 may be a switch and current control element 88 may be a current source.

Signal detection circuit 82 includes an AC detector 90 having an input terminal 90A that may serve as or may be coupled to input terminal 80A, an input terminal 90B coupled for receiving a reference potential $V_{REF1}$, and an output terminal 90C. In accordance with an embodiment of the present invention, AC detector 90 may be comprised of a comparator 92 connected to a filter 94. By way of example, comparator 92 has a noninverting input terminal that may serve as or be connected to input terminal 90A, an inverting input terminal that may serve as or be connected to input terminal 90B, and an output terminal 92A. Filter 94 has an input terminal and an output terminal, wherein the input terminal is connected to output terminal 92A of comparator 92 and the output terminal may be connected to or serve as output terminal 90C.

Signal detection circuit 82 further includes a latch 100 coupled to AC detector 90 through timers 96 and 98. More particularly, timer 96 has input terminals 96A and 96B and output terminals 96C and 96D and timer 98 has an input terminal and an output terminal. Input terminal 96B is connected to output terminal 90C and input terminal 96A is connected to a reset input terminal of latch 100. Output terminal 96C is connected to a set input terminal of latch 100 and output terminal 96D is connected to the input terminal of timer 98. The output terminal of timer 98 is commonly connected to the reset input terminal of latch 100 and to input terminal 96A of timer 96. The output terminal of latch 100 may serve as or be connected to output terminal 82C. As discussed above, output terminal 82C is commonly connected to input terminal 86A of OR gate 86 and to control terminal 88A of a switch 88.

By way of example, signal detection circuit 84 is comprised of a hysteresis comparator 85 having an inverting input terminal that may serve as or be connected to input terminals 80B or 84A, a noninverting input terminal that may be coupled for receiving reference voltage $V_{REF2}$, and an output terminal connected to input terminal 86B of OR gate 86.

In operation in accordance with an embodiment of the present invention, AC detector 90 senses or detects whether an AC signal is present at input terminal 80A. In response to an AC signal at input terminals 12 and 14, diodes 44 and 46 cooperate to create a periodic AC signal at their cathodes, and a periodic AC signal is generated at input terminal 80A of discharge circuit 80. As discussed above, resistor 48 is an optional circuit element that spreads the power loss between itself and discharge circuit 80. In response to the AC signal at input terminal 80A, discharge circuit 80 is configured to operate in a high impedance state such that a high impedance appears at input terminal 80A.

In the absence of an AC signal at input terminal 80A, a voltage that is substantially a DC voltage appears at input terminal 80A and is compared to reference voltage $V_{REF1}$ by comparator 92. By way of example, reference voltage $V_{REF1}$ is about 20 volts. In response to the voltage at input terminal 80A being a DC voltage that is less than or greater than reference voltage $V_{REF1}$, there is no crossing of the reference voltage $V_{REF1}$. Thus, discharge circuit 80 discharges capacitors 32 and 34 (shown in FIG. 1) until the DC voltage at input terminal 80A is less than a voltage that maintains current source 87 and switch 88 in an on state. By way of example, the DC voltage level is about 5 volts. In response to a voltage at input terminal 80A being below this voltage level, discharge circuit 80 operates in an idle mode, wherein current source 87 is nonconducting and switch 88 is open. Idle mode operation indicates that capacitors 32 and 34 are sufficiently discharged so that the voltage across these capacitors is below a safe level given by safety guidelines such as, for example, IEC 60950 Safety guidelines for information technology equipment.

In response to the voltage at input terminal 80A crossing reference voltage $V_{REF1}$, AC detector 90 generates a filtered leading edge of a logic high voltage at output terminal 90C, which is transmitted to input terminal 96B and enables timer 96. If AC detector 90 does not detect a transition before the time on timer 96 expires, timer 96 generates a logic high voltage at output terminal 96C and a logic high voltage at output terminal 96D. The logic high voltage at output terminal 96C is transmitted to the set input terminal of latch 100 and the logic high voltage at output terminal 96D is transmitted to an input terminal of timer 98. The logic high voltage at the set input terminal causes latch 100 to generate a logic high voltage at output terminal 82C causing OR gate 86 to generate a logic high voltage signal at its output terminal which activates current source 87. In addition, the logic high voltage signal at output terminal 82C appears at the control terminal of switch 88 causing it to close. In embodiments in which switch 88 is a transistor, it should be noted that transistor 88 is on and conducting current $I_{DIS}$ and its drain voltage is close to the voltage of source of operating potential $V_{SS}$. Input terminal 80B is coupled from the drain terminal of transistor 88 through diode 89, for inhibiting discharge of capacitor 52 (shown in FIG. 1).

In response to a leading edge of the logic high voltage at its input terminal, timer 98 generates a logic high voltage at its output terminal after a predetermined period of time. The logic high voltage is transmitted to the reset input terminal of latch 100 and input terminal 96A of timer 96. In response to a leading edge of the logic high voltage at input terminal 96A and the reset input terminal, discharge circuit 80 initiates another detect phase.

Because switch 88 is closed and conducting current, most of discharge current $I_{DIS}$ flows through switch 88 rather than towards input terminal 80B and through a circuit element such as, for example, capacitor 52 (shown in FIG. 1). It should be noted that in embodiments in which switch 88 is a transistor that is on, the voltage at input terminal 84A is decoupled from terminals 87B and 88B by diode 89 and capacitor 52 supplies power to the system. If the voltage at input terminal 84A is less than reference voltage $V_{REF2}$, a logic high voltage appears at the output terminal of comparator 85 and at input terminal 86B of OR gate 86. In response to the logic high voltage at input terminal 86B, OR gate 86 generates a logic high voltage at its output terminal which maintains current source 87 on and conducting current independently of the state of signal detection circuit 82. Diode 89 serves to block a discharge path from supply capacitor 52 (shown in FIG. 1) through switch 88.

Figure 7:
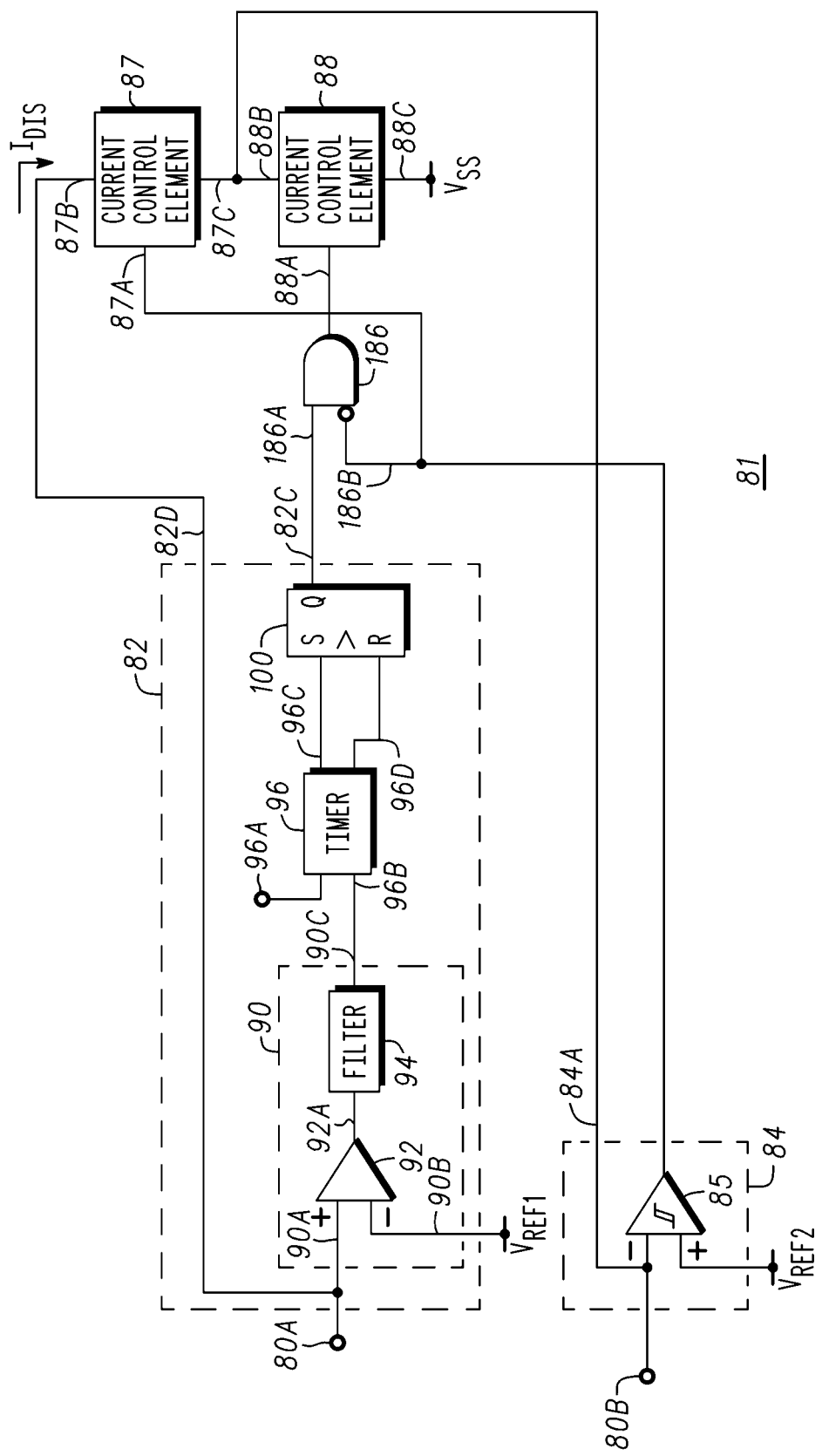
FIG. 7 is circuit schematic of a discharge circuit in accordance with another embodiment of the present invention.

FIG. 7 is a circuit schematic of a discharge circuit 81 in accordance with another embodiment of the present invention. Discharge circuit 81 is similar to discharge circuit 80 except that diode 89 and timer 98 are absent and OR gate 86 has been replaced by an AND gate 186 having input terminals 186A and 186B, where input terminal 186B is an inverting input terminal. Discharge circuit 81 may replace discharge circuit 80 in converter 10, discharge circuit 80 in converter 110, or discharge circuits 80 and 80$_1$ in converter 150. Timer 96 is included to validate whether the input voltage at terminals 12 and 14 is an AC voltage or a DC voltage. Timer 96 is enabled on each transition and reset on the following transition. If AC detector 90 does not detect a transition before the time of timer 96 expires, timer 96 generates a logic high voltage signal at output terminal 96C, which is transmitted to the set input terminal of latch 100. The logic high voltage at the set input terminal causes latch 100 to generate a logic high voltage at output terminal 82C which is transmitted to AND gate 186. Because the voltage at input terminal 80B is greater than reference voltage $V_{REF2}$, signal detection circuit 84 generates a logic low voltage level which is transmitted to input terminal 186B. In response to the logic high voltage level at input terminal 186A and the logic low voltage level at input terminal 186B, AND gate 186 generates a logic high voltage level at its output terminal which activates or turns on switch 88. The logic low output voltage from signal detector 84 turns off current source 87.

Activating switch 88 discharges supply capacitor 52 to the lower supply threshold voltage given by reference voltage $V_{REF2}$ and the hysteresis of hysteresis comparator 85. In response to reaching the lower supply threshold voltage, a logic high voltage appears at the output terminal of hysteresis comparator 85 and at input terminal 186B. The logic high voltage at input terminal 186B is transmitted to the inverting input terminal of AND gate 186 which generates a logic low voltage signal at its output terminal deactivating switch 88. The logic high voltage at input terminal 186B turns on current source 87, which discharges input filter capacitors 32 and 34. The charge on input filter capacitors 32 and 34 is transferred to supply capacitor 52 and charges it to the upper supply voltage, given by reference voltage $V_{REF2}$ and the hysteresis of hysteresis comparator 85. In response to reaching the upper voltage threshold, a logic low voltage appears at the output terminal of comparator 85 and at input terminal 186B. The logic low voltage level at input terminal 186B deactivates current source 87 and is transmitted to the inverting input terminal of AND gate 186 causing AND gate 186 to generate a logic high voltage level at its output terminal, which activates switch 88 so that discharge circuit 80 can initiate another discharge phase.

Figure 8:
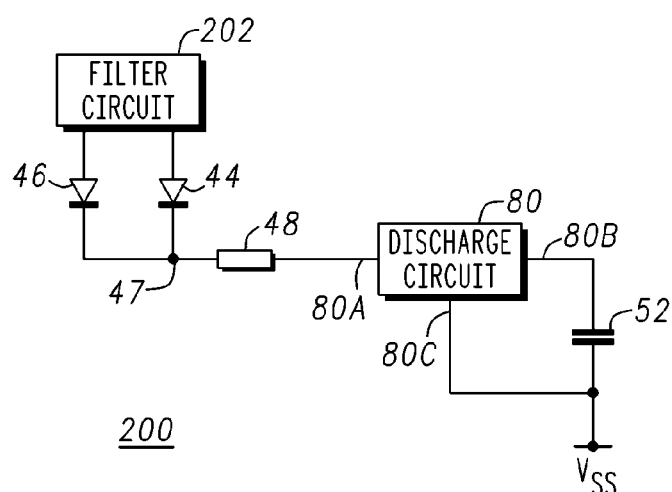
FIG. 8 is circuit schematic of a converter in accordance with another embodiment of the present invention.

FIG. 8 is a block diagram of a power supply 200 in accordance with another embodiment of the present invention. Power supply 200 includes a filter circuit or filter stage 202 coupled to discharge circuit 80 through diodes 44 and 46 and impedance element 48. More particularly, the anodes of diodes 44 and 46 are connected to corresponding output terminals of filter circuit 202 and the cathodes of diodes 44 and 46 are commonly connected together to form node 47. Optionally, discharge circuit 80 is coupled to the cathodes of diodes 44 and 46 through resistor 48. A capacitor 52 is coupled to output terminal 80B of discharge circuit 80. Filter circuit 202 may be comprised of inductive filter 20, capacitors 32 and 34 and diode bridge 22 shown in FIG. 1. Alternatively, filter circuit 202 may be comprised of capacitor 34, wherein nodes 40 and 42 serve as input terminals such as, for example input terminals 12 and 14, respectively.

By now it should be appreciated that a converter having a discharge circuit and a method for discharging filter capacitors have been provided. The discharge circuit may be integrated with a startup circuit to provide high voltage startup and input filter capacitor functions using a single terminal. Although the discharge circuit may be integrated with the startup circuit, it does not interfere with the system restart time. In accordance with various embodiments, the discharge circuit transfers charge from input filter capacitors 32 and 34 to one or more supply capacitors such as capacitor 52. It should be noted that embodiments may not include a direct path between the high voltage input terminal and ground.

In accordance with an embodiment, a discharge circuit includes a signal detection circuit 82 and a capacitor charging circuit 84. The signal detection circuit detects or senses whether an AC signal or a DC signal is present on the input terminals of the converter. If an AC signal is present, the input filter capacitors are not discharged and if a DC signal is present the input filter capacitors may need to be discharged. The capacitor charging circuit 84 controls charging of one or more supply capacitors. In response to the voltage at input terminal 80B being less than a predetermined reference voltage, the capacitor charging circuit 84 generates a signal capable of turning on current source 87 to a supply capacitor connected to input terminal 80B. In response to the voltage at input terminal 80B being greater than the predetermined reference voltage, charging circuit 84 generates a signal used for disabling current source 87.

Although specific embodiments have been disclosed herein, it is not intended that the invention be limited to the disclosed embodiments. Those skilled in the art will recognize that modifications and variations can be made without departing from the spirit of the invention. It is intended that the invention encompass all such modifications and variations as fall within the scope of the appended claims.

What is claimed is:

1. A power supply, comprising:
    a first signal detection circuit having an input terminal and an output terminal;
    a logic circuit having first and second input terminals and an output terminal, the first input terminal coupled to the output terminal of the first signal detection circuit;
    a second signal detection circuit having first and second input terminals and an output terminal, the first input terminal coupled for receiving a first reference signal and the output terminal coupled to the second input terminal of the logic circuit;
    a first current control element having first and second current carrying terminals and a control terminal, the second input terminal of the logic circuit coupled to the control terminal of the first current control element, the first current carrying terminal coupled to the input terminal of the first signal detection circuit; and
    a second current control element having first and second current carrying terminals and a control terminal, the control terminal coupled to the output terminal of the logic circuit and the first current carrying terminal coupled to the second current carrying terminal of the first current control element.

2. The power supply of claim 1, wherein the first signal detection circuit comprises:
    an AC detector having a first input terminal that serves as the input terminal of the first signal detection circuit, a second input terminal, and an output terminal;
    a first timer having first and second input terminals and first and second output terminals, the first input terminal coupled to the output terminal of the AC detector;
    a second timer having an input terminal and an output terminal, the input terminal of the second timer coupled to the first output terminal of the first timer and the output terminal of the second timer coupled to the second input terminal of the first timer; and
    a latch having first and second input terminals and an output terminal, the first input terminal of the latch commonly coupled to the output terminal of the second timer and the second input terminal of the first timer, the second input terminal of the latch coupled to the second output terminal of the first timer, and the output terminal of the latch serving as the output terminal of the first signal detection circuit.

3. The power supply of claim 1, further including a diode having an anode coupled to the second current carrying terminal of the first current control element and a cathode coupled to the second input terminal of the second detection circuit.

4. The power supply of claim 1, wherein
    the logic circuit comprises an OR or an AND gate;
    the first current control element comprises a first current source; and
    the second current control element comprises a switch.

5. The power supply of claim 1, wherein
    the logic circuit comprises an OR or an AND gate;
    the first current control element comprises a first current source; and
    the second current control element comprises a second current source.

6. The power supply of claim 1, wherein
    the logic circuit comprises an OR or an AND gate;
    the first current control element comprises a first switch; and
    the second current control element comprises a second switch.

7. The power supply of claim 1, wherein the signal detection circuit comprises:
    an AC detector having a first input terminal that serves as the input terminal of the first signal detection circuit, a second input terminal, and an output terminal;
    a timer having first and second input terminals and first and second output terminals, the first input terminal coupled to the output terminal of the AC detector; and
    a latch having first and second input terminals and an output terminal, the first input terminal of the latch coupled to the output terminal of the timer, the second input terminal of the latch coupled to the second output terminal of the first timer, and the output terminal of the latch serving as the output terminal of the first signal detection circuit.

8. The power supply of claim 1, wherein
    the logic circuit comprises an AND gate;
    the first current control element comprises a first current source; and
    the second current control element comprises a switch.

9. The power supply of claim 1, wherein the second signal detection circuit comprises a comparator with hysteresis.

10. The power supply of claim 1, further including a capacitor having a first terminal coupled to the input terminal of the first signal detection circuit.

11. A power supply comprising:
    a filter stage having at least one input terminal and an output terminal;
    a discharge circuit having an input terminal and an output terminal, the input terminal of the discharge circuit coupled to the output terminal of the filter stage, the discharge circuit comprising:
        a first detection stage having first and second input terminals and an output terminal, first input terminal serving as the input terminal of the discharge circuit;
        a gating element having first and second input terminals and an output terminal, the first input terminal coupled to the output terminal of the first detection stage;
        a second detection stage having first and second input terminals and an output terminal, the output terminal coupled to the second input terminal of the gating element;
        a first current control element having a control terminal and first and second current carrying terminals, the first current control terminal coupled to the output of the gating element and the first current carrying terminal coupled to the first input terminal of the second detection stage; and
    a diode having an anode and a cathode, the anode coupled to the first current carrying terminal of the first current control element and the cathode coupled to the first input terminal of the second detection stage.

12. The power supply of claim 11, wherein the gating element comprises an AND gate or an OR gate.

13. The power supply of claim 11, wherein the first current control element comprises a transistor.

14. The power supply of claim 11, further including a second current control element having a control terminal and first and second current carrying terminals, the control terminal of the second current control element coupled to the second input terminal of the gating element and the first current carrying terminal coupled to the first current carrying terminal of the first current control element.

15. The power supply of claim 11, further including a second current control element having a control terminal and first and second current carrying terminals, the control terminal of the second current control element coupled to the second input terminal of the gating element and the first current carrying terminal coupled to the input terminal of the detection stage.

16. A power supply comprising:
a filter stage having at least one input terminal and an output terminal;
a discharge circuit having an input terminal and an output terminal, the input terminal of the discharge circuit coupled to the output terminal of the filter stage, the discharge circuit comprising:
a first detection stage having first and second input terminals and an output terminal, first input terminal serving as the input terminal of the discharge circuit, wherein the first detection stage comprises:
an AC detector having a first input terminal that serves as the input terminal of the first detection stage, a second input terminal, and an output terminal;
at least one timer having first and second input terminals and first and second output terminals, the first input terminal coupled to the output terminal of the AC detector; and
a latch having a first input terminal coupled to the first output terminal of the at least one timer and the output terminal serving as the output terminal of the first detection stage;
a gating element having first and second input terminals and an output terminal, the first input terminal coupled to the output terminal of the first detection stage;
a second detection stage having first and second input terminals and an output terminal, the output terminal coupled to the second input terminal of the gating element;
a first current control element having a control terminal and first and second current carrying terminals, the first current control terminal coupled to the output of the gating element and the first current carrying terminal directly coupled to the first input terminal of the second detection stage.

17. The power supply of claim 16, wherein the gating element comprises an AND gate or an OR gate.

18. The power supply of claim 16, wherein the first current control element comprises a transistor.

19. The power supply of claim 16, further including a second current control element having a control terminal and first and second current carrying terminals, the control terminal of the second current control element coupled to the second input terminal of the gating element and the first current carrying terminal coupled to the first current carrying terminal of the first current control element.

20. The power supply of claim 16, further including a second current control element having a control terminal and first and second current carrying terminals, the control terminal of the second current control element coupled to the second input terminal of the gating element and the first current carrying terminal coupled to the input terminal of the detection stage.

21. A method for operating a power supply, comprising:
generating a first signal in response to removing a first AC signal from an input to a filter stage, wherein the first signal is greater than or less than a first reference level; and
discharging one or more capacitors coupled to the filter stage in response to the first signal being greater than or less than the first reference level for a predetermined period of time, wherein discharging the one or more capacitors coupled to the filter stage includes:
starting a first timer in response to the first signal;
starting a second timer in response to the first signal being delayed by a second predetermined period of time; and
generating a control signal in response to the first signal being delayed by the first predetermined period of time; and
using the control signal to generate a discharge current.

22. The method of claim 21, further including charging the one or more capacitors coupled to the filter stage in response to a second AC signal transitioning through the first reference signal.

23. The method of claim 21, wherein using the control signal to generate the discharge current includes routing the discharge current to a first source of operating potential.

24. The method of claim 21, wherein using the control signal to generate the discharge current includes using the discharge current to charge the supply capacitor.

* * * * *